July 5, 1966 R. P. BURR 3,259,768
DYNAMOELECTRIC MACHINE AND METHOD OF MAKING ARMATURE
Original Filed March 18, 1959 3 Sheets-Sheet 1
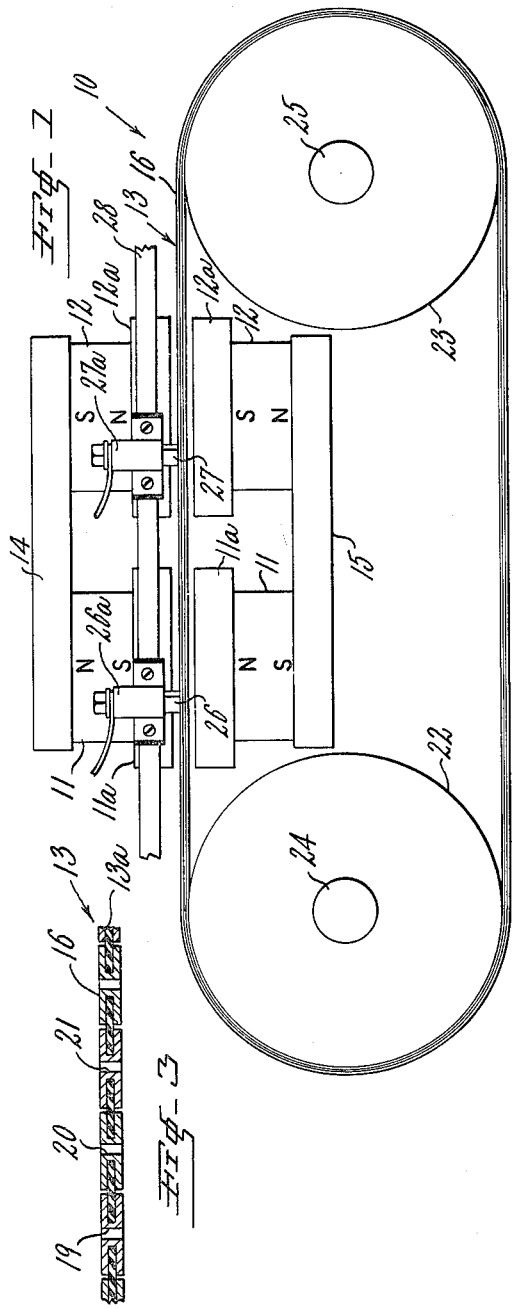
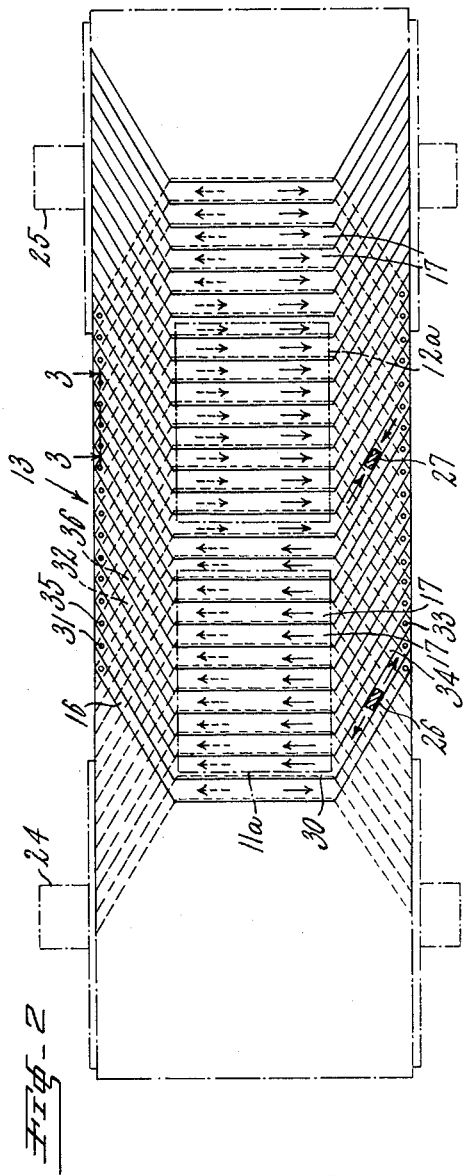
INVENTOR.
ROBERT P. BURR
BY Charles A. Blank
ATTORNEY INVENTOR.
ROBERT P. BURR
BY
Charles A. Blank
ATTORNEY July 5, 1966   R. P. BURR   3,259,768
DYNAMOELECTRIC MACHINE AND METHOD OF MAKING ARMATURE
Original Filed March 18, 1959   3 Sheets-Sheet 3
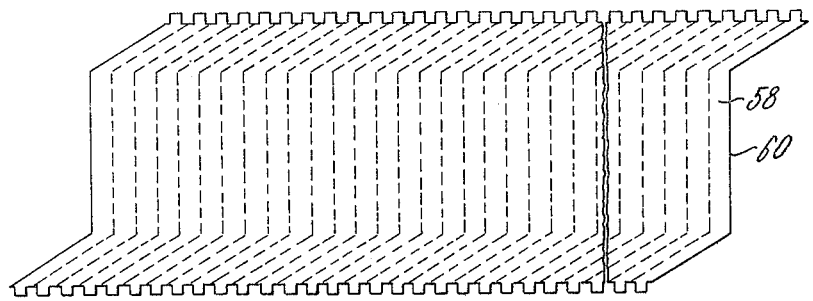
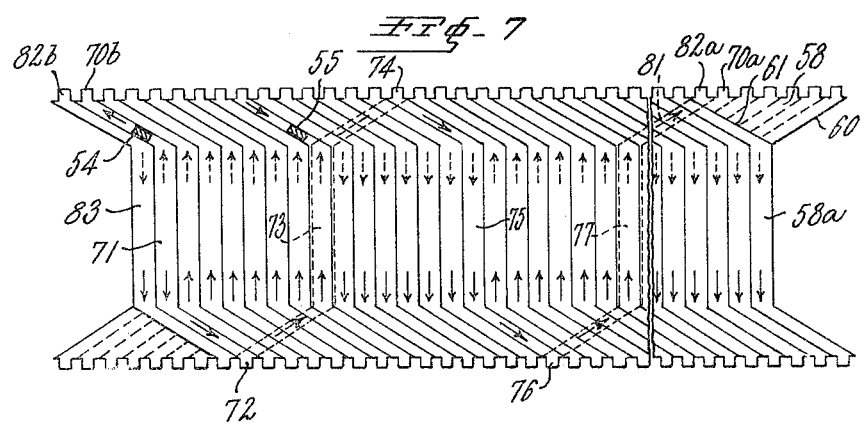
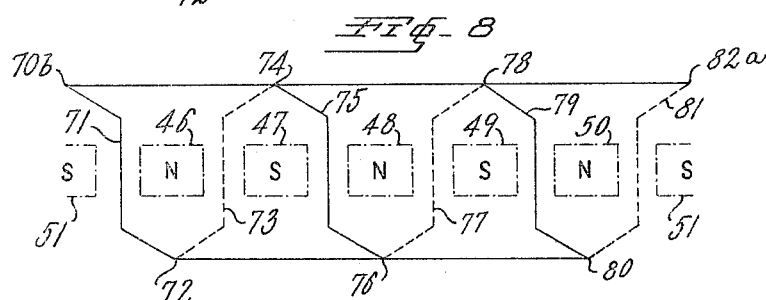
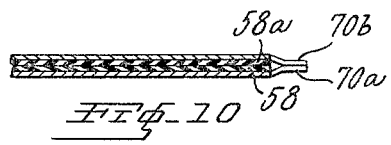
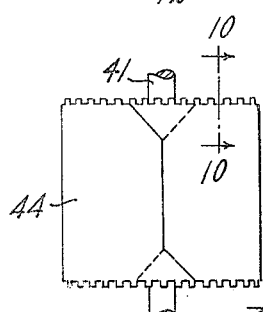
INVENTOR.
ROBERT P. BURR
BY
Charles A. Blank
ATTORNEY

United States Patent Office 3,259,768
Patented July 5, 1966

3,259,768
DYNAMOELECTRIC MACHINE AND METHOD OF MAKING ARMATURE
Robert P. Burr, Lloyd Harbor, Huntington, N.Y., assignor to Printed Motors, Inc., New York, N.Y., a corporation of Delaware
Continuation of application Ser. No. 800,254, Mar. 18, 1959. This application Mar. 22, 1963, Ser. No. 267,266
21 Claims. (Cl. 310—13)

This invention relates to electromechanical energy converters and, more particularly, to such converters which may, for example, be alternating-current or direct-current motors or generators. The invention relates to motors and generators which are capable of continuous displacement or rotation and which are capable of alternate intermittent rotations in opposite directions, providing an oscillatory motion. The invention is particularly directed to motors and generators utilizing displaceable members or armatures having printed-circuit conductors, such as plated or etched conductors. The invention is also directed to a method of making a displaceable member suitable for use as an armature in an electromechanical energy converter.

This application is a continuation of my copending application Serial No. 800,254, filed March 18, 1959, now abandoned.

Electrical rotating machines utilizing printed-circuit armatures are described and claimed in a copending application Serial No. 691,434, filed October 21, 1957 by F. H. Raymond and J. Henry-Baudot now Patent No. 3,090,880 and in application Serial No. 1,128 filed January 7, 1960 by J. Henry-Baudot now Patent No. 3,144,574 in part a division of application Serial No. 691,434. Improved printed-circuit armatures suitable for use in electrical rotating machines are also described and claimed in a copending application Serial No. 792,733, entitled "Printed Circuit Armature," filed February 12, 1959 by Robert L. Swiggett, now Patent 2,970,238. There are specifically described in the aforesaid applications armatures of the type having conductive patterns coated on a disc of insulating material mounted for rotation in the plane of the disc. As pointed out in the aforesaid applications, motors and generators utilizing printed-circuit armatures have the important advantage of being capable of starting and stopping very rapidly because of the low inertia of the armatures.

The present invention relates to an electromechanical energy converter utilizing a displaceable member, for example, a continuous belt or ribbon, which is longitudinally displaced through the converter. As will be described subsequently, a direct-current motor utilizing such a displaceable member can be employed to drive two separate shafts with no mechanical coupling therebetween other than the continuous belt. The invention also relates to electromechanical energy converters utilizing an armature in the form of a cylinder having a printed-circuit winding thereon and to a method of making such an armature.

It is an object of the present invention, therefore, to provide a new and improved electromechanical energy converter having good acceleration and deceleration characteristics.

It is another object of the invention to provide a new and improved electromechanical energy converter capable of displacing a longitudinal member.

It is another object of the invention to provide a new and improved electromechanical energy converter having a low-inertia cylindrical armature.

It is another object of the invention to provide a new and improved method of making a printed-circuit cylindrical armature for an electromechanical energy converter.

In accordance with the invention, an electromechanical energy converter comprises means for supplying a magnetic field. The converter includes a displaceable elongated insulating sheet having a conductive circuit coating along the length thereof and having a portion of the coating disposed in the magnetic field. The converter also includes means for translating current flow through the coating to cause an electromechanical conversion of energy supplied to the converter.

Also in accordance with the invention, a member for an electromechanical energy converter comprises an elongated insulating sheet having a conductive coating effectively constituting a winding along the length of said sheet.

Also in accordance with the invention, a method of making a displaceable member for an electromechanical energy converter comprises forming a conductive coating comprising individual conductors on one face of each of a pair of elongated insulating sheets and forming the insulating sheets into a cylinder with one of the coated faces of the insulating sheets as the outer surface of the cylinder and with the other coated insulating sheet as the inner surface of the cylinder and with the ends of the individual conductors being conductively connected.

For a better understanding of the present invention, together with other and further objects thereof, reference is made to the following description taken in connection with the accompanying drawings, and its scope will be pointed out in the appended claims.

Referring to the drawings:

FIG. 1 is a side view, partly diagrammatic, of a direct-current motor utilizing a printed-circuit displaceable member and constructed in accordance with the present invention;

FIG. 2 is a fragmentary plan view, partly diagrammatic, of the displaceable member of the FIG. 1 motor;

FIG. 3 is an enlarged sectional view taken along line 3—3 of FIG. 2 to represent the construction of the displaceable member;

FIG. 6 is a fragmentary plan view, partly diagrammatic, of a coated insulating sheet used in the manufacture of the armature of the FIG. 4 motor;

FIG. 7 is a plan view, partly diagrammatic, of two coated insulating sheets similar to the FIG. 6 sheet and superimposed to represent their relative positions in the armature of the FIG. 4 motor;

FIG. 8 is a diagram to represent a current path in the armature of the FIG. 4 motor;

FIG. 9 is a side view of the armature of the FIG. 4 motor; and

FIG. 10 is an enlarged fragmentary sectional view, taken along line 10—10 of FIG. 9, representing tabs of the armature after dip soldering.

Figure 4:
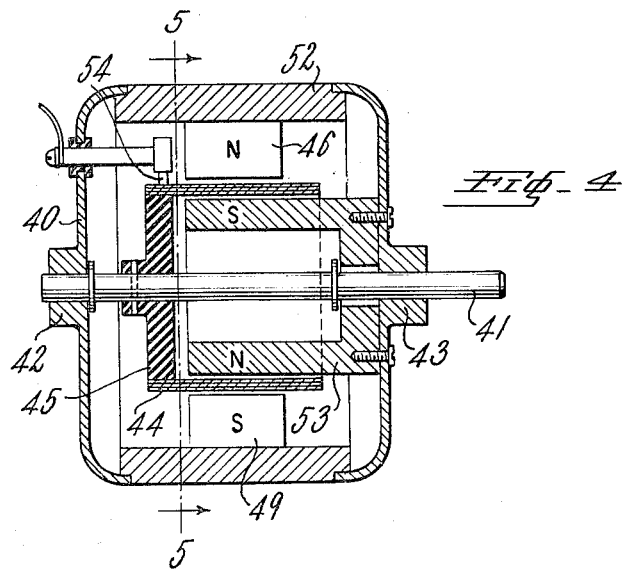
FIG. 4 is a sectional view, partly diagrammatic, of a six-pole motor constructed in accordance with another form of the invention.

Referring now more particularly to FIG. 1 of the drawings, an electromechanical energy converter constructed in accordance with the invention comprises, for example, a direct-current motor 10 which may be enclosed in a suitable housing (not shown). The motor 10 includes means for supplying a magnetic field. Two sets of magnets 11 and 12 having pole pieces 11a and 12a are mounted to provide fields of opposite polarity through adjacent regions of a displaceable elongated sheet 13, as represented by the North-South symbols N-S. Ferromagnetic bars 14, 15 are attached to the magnets to provide a complete path for magnetic flux. If desired, the magnets on one side of the sheet 13 may be omitted and a suitable ferromagnetic bar, such as the bar 14, may be positioned near the sheet 13 to minimize the air gap in the magnetic field and to complete the path for magnetic flux. Also, a single set of magnets, for example, magnets 11, may be employed along the length of the sheet 13 instead of magnets 11 and 12.

The sheet 13 comprises an insulating sheet having a conductive coating 16 along the length thereof, as represented in FIG. 2 and FIG. 3. A portion of the conductive coating is disposed in the magnetic field. The conductive circuit coating 16 preferably is on both faces of the sheet along the entire length thereof, effectively forming a continuous winding. The solid-line construction of FIG. 2 represents the conductors on one face of the insulating sheet while the dash-line construction represents the conductors on the other face of the sheet. The dot-dash line construction represents the position of pole pieces 11a, 12a. The lines between conductors 17 of FIG. 2 represent uncoated or insulating regions of the sheet 13.

The sheet 13 preferably comprises a suitable insulating sheet material such as Mylar, which is a commercially available polyester film made by E. I. du Pont de Nemours & Co., Inc. The insulating sheet material 13a is apparent in FIG. 3 which is a sectional view of a portion of the displaceable member along lines 3—3 of FIG. 2. The Mylar sheet 13a preferably is a film having a thickness of, for example .005 inch and a width of, for example, 3 inches. The Mylar sheet 13a is also represented by the lines representing conductor boundaries in FIG. 3. The central portions of the conductors 17 coated on both sides of the sheet may coincide. Interconnections between the conductors comprise conductive coatings, for example 19, 20, 21 of FIG. 3 bounding apertures through the insulating material.

The sheet 13 may be a continuous belt, tape, or ribbon disposed around pulleys 22, 23 mounted on rotatable shafts 24, 25 which may be journaled in suitable bearings (not shown). Alternatively, the pulleys 22, 23 may be utilized as feed and take up pulleys and the sheet 13 may initially be wound around one pulley and displaced to the other pulley through the operation of the motor, to be described subsequently. If desired, the sheet 13 might have a reinforced, insulated, perforated portion extending along its outer edge for engaging sprockets (not shown) in lieu of pulleys to drive the shafts synchronously.

The converter also includes means for translating current flow through the conductive circuit coating to cause an electromechanical conversion of energy supplied to the converter. More particularly, this means comprises, for example, a pair of brushes 26, 27 in conductive contact with individual conductors of the coating for supplying current flow to cause longitudinal displacement of the insulating sheet. The brushes may be mounted in suitably insulated brush holders 26a, 27a attached to a support 28 with one brush contacting the conductor passing between magnets 11 and 12.

The conductor pattern and the corresponding pattern for current flow through the coating will be partially traced with reference to FIG. 2. Assuming the current to enter the motor at brush 26 disclosed in contact with conductor 30, current flows along conductor 30 through aperture 31 to conductor 32 on the other side of the insulating sheet, through aperture 33 along conductor 34, through aperture 35 and along conductor 36 on the other side of the insulating sheet. The conductor pattern and current flow progress along the winding in this manner until current flows out of the coating through brush 27. Representative directions of current flow on one face of the sheet are indicated by arrows in solid-line construction while current flow through conductors on the other face of the sheet are represented by arrows in broken-line construction.

As represented in FIG. 2, in a given region of the sheet 13 current flows in the same direction across the sheet through conductors superimposed on opposite surfaces of the sheet. In adjacent regions along the length of the sheet 13 corresponding to the positions of pole pieces 11a and 12a, current flows in opposite directions. Accordingly, due to the reverse polarity of magnets 11 and 12, there is developed a resultant force in two regions of the sheet in the same longitudinal direction, causing the sheet to be displaced longitudinally. The longitudinal displacement may be reversed by reversing the direction of current flow through the conductors. Because of the very low inertia of the sheet 13, the reversal of the direction of displacement of the sheet 13 may occur several times a second, if desired.

A method of manufacturing the coated sheet 13 will be briefly described. A sheet of Mylar is drilled, perforated or punched to form apertures as represented in FIGS. 2 and 3. The sheet is then coated with a copper film on all exposed surfaces, including the walls of the apertures, to a thickness of approximately .00001 inch by immersion in an electroless copper deposition solution ordinarily employed in the manufacture of printed circuits. The copper-coated faces are then coated with a suitable screen printing-ink plating resist, known to the art, which resists copper electroplating and which is printed on the copper to form the pattern to be etched, represented by the black lines of FIG. 2. The sheet 13 is then copper-plated on its faces and through its apertures. After plating to the desired copper thickness (for example, approximately .005), the part is removed from the electroplating bath and the ink is cleaned off, leaving exposed the thin electroless copper film which was under the ink. The sheet is then immersed briefly in an etching solution, which removes the thin electroless copper film which was under the ink to form the conductors represented in FIG. 3.

It should also be understood that the conductive coating on the surfaces of the insulating sheet may comprise, for example a copper-foil material which is laminated to the insulating sheet and is subsequently etched.

An alternating-current motor may be constructed in accordance with the invention by utilizing electromagnets in lieu of the permanent magnets 11 and 12 of FIGS. 1 and 2 and connecting the winding of the magnets in series with the brushes so that current flows through magnets 11 in such a direction as to develop a magnetic field of one polarity at the same time that current flows through magnets 12 in such a direction as to develop a magnetic field of the opposite polarity. The fields of the magnets reverse with alternations of the current flow to provide a substantially continuous resultant force in a given direction on the sheet 13. Also, the sheet 13 of the FIG. 2 embodiment could be coated with a closed conductive pattern similar to the wave winding of the FIG. 4 and FIG. 5 motor presently to be described. If such a pattern were employed, it would be desirable to utilize, where possible, a set of magnets corresponding to each region of current reversal to operate the motor with maximum efficiency.

The FIGS. 1 and 2 converter may be utilized as a generator by driving one of the shafts 24, 25 to transport the sheet 13 through the magnetic field and to cause current flow in the winding as a result of the induced voltage in the winding.

Figure 5:
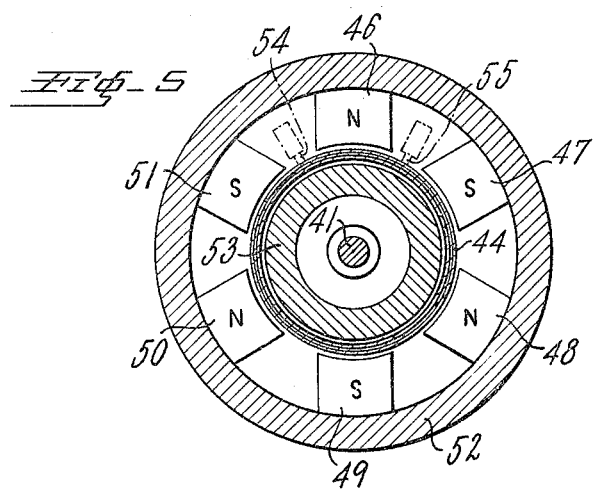
FIG. 5 is a sectional view, partly diagrammatic, taken along line 5—5 of FIG. 4.

Referring now more particularly to FIGS. 4 and 5 of the drawing, a direct-current motor having a cylindrical printed-circuit armature of low inertia and constructed in accordance with the invention is there represented. A motor housing 40 supports a central shaft 41 journaled in suitable bearings 42, 43. An armature 44 forming a hollow cylinder and constructed in accordance with the invention is mounted on a suitable insulating support 45 attached to the shaft 41. The motor is, for example, a six pole motor utilizing six permanent magnets 46 to 51 inclusive to establish a magnetic field. An annulus 52 of ferromagnetic material is attached to the other end of the magnets to provide a path for magnetic flux. The magnets are mounted to provide fields of alternative polarity through adjacent regions of the armature as represented by the North-South symbols N-S of FIGS. 4 and 5, A cylinder 53 of the ferromagnetic material is positioned inside the cylindrical armature to minimize the air gap in the magnetic field and to complete the path for magnetic flux. Suitable brushes 54, 55 mounted in suitably insulated supports are positioned approximately midway between magnets 51 and 46 and between magnets 46 and 47 to supply current to the motor, as will be described in detail subsequently. The brushes are connected to electrical leads in a conventional manner. Additional pairs of brushes may be utilized, if desired.

Referring now more particularly to FIGS. 6 to 10, inclusive, the armature 44 comprises a displaceable insulating sheet formed into a closed surface, preferably forming a cylindrical wall having a conductive circuit coating 58, 58a on the inner and outer surfaces thereof. The coating effectively forms a winding having turns extending longitudinally of the cylinder and progressing along the circumferential length thereof.

In accordance with the invention, a method of making the armature comprises forming a conductive coating comprising individual conductors on one face of each of a pair of elongated insulating sheets 60, 61 and forming the insulating sheets into a cylinder with one of the coated faces of one of the insulating sheets as the outer surface of the cylinder and with the other coated insulating sheet as the inner surface of the cylinder and with the ends of the individual conductors being conductively connected.

The sheets 60 and 61 preferably have substantially the same length and the edges of the sheets are preferably shaped to conform with the pattern of the conductors. The sheet 60 of FIG. 6 is represented as having a coating under the sheet with the edges of the conductors or insulating regions of the sheet being represented in broken-line construction. The edges of the sheet 60 preferably extend very slightly beyond the end conductors to provide insulated edges to be butted when the cylinder is formed. The sheets 60 and 61 of FIG. 7 preferably have similar patterns. That is, the pattern on the sheet 60 appears similar to the pattern on the sheet 61 when each pattern is viewed from the side of the sheet on which that pattern appears. The conductor configurations are in a reversed relationship as viewed from outside the cylinder.

The sheets may be placed with the tabs in registry to form the pattern represented in FIG. 7 when viewed from one side of the sheets corresponding to the outside of the cylinder. When the sheets are rolled to form cylinder tabs 70a and 70b of FIG. 7 register to provide a progressive winding around the cylinder. When the sheet is employed in a six pole machine, the armature has, for example, 43 conductors on each surface of the cylinder. Conductors represented diagrammatically in FIG. 8 as being in the region of magnets 49 and 50 have been omitted from FIG. 7.

The sheets may be rolled into a cylinder as a unit or one sheet may be rolled into a cylinder and then the other rolled into a cylinder which fits inside the first cylinder and is rotated to provide registry between the tabs. The edges of the sheets preferably butt as represented in FIG. 9 and may be joined adhesively. Thereafter, the sheets may be conductively connected by dip soldering the tabs and the sheets may also be adhesively attached to each other. A conductive connection between tabs 70a and 70b is represented in FIG. 10.

If desired, conductive connections between the surfaces of the cylinder may be made by utilizing coated apertures to provide the connections in the manner of the FIG. 2 embodiment.

A current path around the cylinder is represented diagrammatically in FIGS. 7 and 8. For example, current flows from brush 54 along conductor 71 to tab 72, along conductor 73 under the insulating sheet and represented in broken-line construction to tab 74, along conductor 75 to tab 76, along conductor 77 to tab 78 (not shown in FIG. 7), along conductor 79 to tab 80 (not shown in FIG. 7), along conductor 81 to tab 82a which is in registry with tab 82b and is conductively connected thereto when the cylinder is formed. Current then flows along conductor 83 and follows a path similar to that just traced until the current flows to brush 55.

As represented by the solid-line and broken-line arrows, current flow is in the same direction in superimposed conductors over and under the sheet (inside and outside the cylinder) in a given region of the sheet. Current flow is in opposite directions in adjacent regions. Thus, as represented diagrammatically in FIG. 8, due to the reversal of polarity of the magnetic field in adjacent regions, a resultant force is developed causing the armature to rotate.

The converter may be used as a generator by mechanically driving shaft 41.

From the foregoing description, it will be apparent that an electromechanical energy converter constructed in accordance with the invention has the advantage of displacing a member of low inertia which is capable of starting and stopping very rapidly. The displaceable member may be longitudinally or rotationally displaceable. The invention also has the advantage of providing a new and improved method of manufacturing a cylindrical printed-circuit armature. A cylindrical printed-circuit rotor has the advantage of being smaller in diameter than a disc-like printed-circuit rotor for a machine of the same power output and crowding of interconnections between conductors is minimized. The cooling of a cylindrical rotor is particularly good if the magnets are positioned inside rather than outside the cylinder of the armature.

The invention may be embodied in a wide variety of motors, for example, synchronous alternating-current motors, squirrel-cage induction motors and universal alternating-current and direct-current motors. To construct a synchronous alternating-current motor, a printed-circuit field winding similar to the armature winding of the FIGS. 4 and 5 motor may be attached with an insulating backing around the cicumference of the inner wall of the motor housing, effectively forming a coating on the inner wall. A rotating permanent magnet may be employed as a rotor. In an induction motor, a printed-circuit armature comprising printed-circuit copper conductors with conductively connected ends can be manufactured in the form of a cylindrical armature or a ribbon-like sheet. A universal motor can be constructed by replacing the magnets of the FIGS. 4 and 5 motor with electromagnets suitably wound for energization by the armature-current flow.

While there have been described what are at present considered to be the preferred embodiments of this invention, it will be obvious to those skilled in the art that various changes and modifications may be made therein without departing from the invention, and it is, therefore aimed to cover all such changes and modifications as fall within the true spirit and scope of the invention.

Having thus described my invention, what I claim and desire to protect by Letters Patent is:

1. An electromechanical energy converter comprising: means for supplying a magnetic field; a hollow, cylindrical, rotatable armature comprising an insulating sheet having a conductive circuit coating over the surface thereof and effectively forming a substantially uniformly distributed winding covering substantially the entire surface of said sheet, said armature having a substantially non-ferrous portion disposed in said magnetic field; means for supporting said armature for displacement; and means for translating current flow through said coating to cause an electromechanical conversion of energy supplied to the converter.

2. A direct-current electromechanical energy converter comprising: means for supplying a magnetic field; a substantially non-ferrous armature comprising a cylindrical, rotatable insulating sheet having a conductive circuit coating on both faces of said sheet and having an open portion disposed in said magnetic field; means attached to said coated sheet solely near one end thereof for supporting said armature for rotation; and direct-current supply means for translating current flow though said coating to cause an electromechanical conversion of energy supplied to the converter.

3. A direct-current linear electromechanical energy converter comprising: means for supplying a magnetic field; an armature comprising a displaceable, elongated insulating sheet having a conductive circuit coating on both faces of said sheet along the length thereof, said coating effectively constituting a continuous winding along the length of said sheet and having a linear portion disposed in said magnetic field; means for supporting said armature for displacement; and direct-current supply means for translating current flow through said coating to cause an electromechanical conversion of energy supplied to the converter.

4. A direct-current electrical motor comprising: means for supplying a magnetic field; a substantially non-ferrous armature comprising a cylindrical, rotatable insulating sheet having a conductive circuit coating over the surface thereof and having an open portion disposed in said magnetic field; said coating forming conductors which are substantially uniformly distributed over substantially the entire surface of said insulating sheet; means attached to said coated sheet solely near one end thereof for supporting said armature for rotation; and direct-current means for supplying current flow through said coating to cause displacement of said armature.

5. A direct-current linear motor comprising: means for supplying a magnetic field; a longitudinally displaceable, elongated endless insulating sheet having a conductive circuit coating along the length thereof effectively forming a winding having turns extending transversely of said sheet and progressing along the length of said sheet and covering substantially the entire surface of said sheet, and having a linear portion of said coating disposed in said magnetic field; and brush means in conductive contact with said coating for supplying direct-current flow through said coating to cause longitudinal displacement of said insulating sheet.

6. An electromechanical energy converter comprising: means for supplying a magnetic field; a substantially non-ferrous armature comprising a rotatable insulating sheet forming a hollow cylinder having an open end and having a conductive circuit coating effectively forming a winding having turns extending longitudinally of said cylinder and progressing along the circumferential length of said cylinder and having a portion of said coating disposed in said magnetic field; means attached to said coated sheet solely near one end thereof for supporting said armature for rotation about its axis; and means for translating current flow through said coating to cause an electromechanical conversion of energy supplied to the converter.

7. An electrical motor comprising: means for supplying a magnetic field; and armature comprising an insulating sheet forming a hollow, rotatable cylinder having an open end and having a conductive coating effectively forming a winding having turns extending longitudinally of said cylinder and progressing along the circumferential length of said cylinder, said armature having a substantially non-ferrous open portion disposed in said magnetic field; means attached to said coated sheet solely near one end thereof for supporting said armature for rotation about its axis; and means for supplying current flow through said coating to cause rotation of said insulating sheet.

8. An electrical generator comprising: means for supplying a magnetic field; an armature comprising an insulating sheet forming a hollow, rotatable cylinder having an open end and having a conductive circuit coating effectively forming a winding having turns extending longitudinally of said cylinder and progressing along the circumferential length of said cylinder, said armature having a substantially non-ferrous open portion disposed in said magnetic field; means attached to said coated sheet solely near one end thereof for rotating said armature in said magnetic field; and means for deriving current flow from said coating.

9. An armature for an electromechanical energy converter comprising: a substantially non-ferrous body comprising an elongated insulating sheet having a conductive coating effectively constituting a winding along the length of said sheet and covering substantially the entire surface of both faces of said sheet, said coating being exposed on both faces of said sheet over substantially the entire surface of said sheet; and means for supporting said body for displacement.

10. A displaceable endless belt for an electromechanical energy converter comprising: a flexible, elongated, endless insulating sheet having a longitudinally linear portion and having over substantially its entire surface a conductive coating effectively constituting a continuous winding along the length of said sheet.

11. An armature for an electromechanical energy converter comprising: an elongated, insulating sheet having a longitudinally linear portion and having over substantially its entire surface a conductive coating effectively constituting a continuous winding having transverse turns progressing along the length thereof, and means for supporting said sheet for displacement along an oval path.

12. An armature for an electromechanical energy converter comprising: a hollow, substantially non-ferrous cylinder having an open end and comprising an insulating sheet having a conductive coating effectively forming a winding having turns extending longitudinally of said cylinder and progressing along the circumferential length of said cylinder; and means for supporting said cylinder for rotation about its axis solely from the other end of said cylinder.

13. An armature for an electromechanical energy converter comprising: a hollow, substantially non-ferrous cylinder having an open end and comprising an elongated insulating sheet having a conductive coating on the inner and outer surfaces thereof, the conductive coatings being conductively connected effectively to form a continuous winding; and means attached to said coated sheet solely near the other end of said cylinder for supporting said cylinder for rotation about its axis.

14. A method of making a displaceable member for an electromechanical energy converter comprising: forming a conductive coating comprising individual conductors on one face of each of a pair of elongated insulating sheets having longitudinal and transverse boundaries and forming said insulating sheets into a cylinder with one of the coated faces of said insulating sheets as the outer surface of said cylinder with the other coated insulating sheet as the inner surface of said cylinder and with the ends of said individual conductors being conductively connected.

15. A method of making an armature for an electromechanical energy converter comprising: forming a conductive coating comprising individual conductors in similar configurations on one face of each of a pair of elongated insulating sheets having longitudinal and transverse boundaries and forming said insulating sheets into a cylinder with the coated faces of said insulating sheets as the inner and outer surfaces of said cylinder and with the ends of said individual conductors on said faces in registry and conductively connected.

16. A method of making an armature for an electromechanical energy converter comprising: forming a conductive coating comprising individual conductors in similar configurations on one face of each of a pair of elongated insulating sheets having longitudinal and transverse boundaries and forming said insulating sheets into a cylinder with the coated faces of said insulating sheets as the inner and outer surfaces of said cylinder and with said conductor configurations on said sheets disposed in a reversed relationship as viewed from outside said cylinder and with the ends of said individual conductors on said faces of said sheets in registry and conductively connected.

17. A method of making an armature for an electromechanical energy converter comprising: forming a conductive coating comprising individual conductors in similar configurations extending transversely on one face of each of a pair of elongated insulating sheets having longitudinal and transverse edges to the longitudinal edges thereof and forming said insulating sheets into a cylinder with the coated faces of said insulating sheets as the inner and outer surfaces of said cylinder and with the conductor configurations on the sheets in a reversed relationship as viewed from outside said cylinder and with the ends of said individual conductors in registry and conductively connected.

18. A method of making an armature for an electromechanical energy converter comprising: forming a conductive coating comprising individual conductors extending transversely on one face of each of a pair of elongated insulating sheets having longitudinal and transverse edges to the longitudinal edges thereof, forming conductive tabs conductively connected to said conductors and extending beyond said longitudinal edges of said sheets, forming said insulating sheets into a cylinder with the coated faces of said insulating sheets as the inner and outer surfaces of said cylinder and with said tabs of one sheet in registry with said tabs of the other sheet, and conductively connecting said registered tabs.

19. A method of making an armature for an electromechanical energy converter comprising: forming a conductive coating comprising individual conductors extending transversely across one face of each of a pair of elongated insulating sheets having longitudinal and transverse edges to the longitudinal edges of said sheets, disposing conductive tabs conductively connected to the ends of said conductors at said longitudinal edges of said sheets, rolling one of said insulating sheets into a cylinder with the coated face of said rolled sheet as the outer surface of said cylinder, rolling the other of said insulating sheets into a cylinder with the coated face of said other insulating sheet as the inner surface of said cylinder, disposing said second cylinder within said first cylinder with said tabs in registry, and dip-soldering said registered tabs effectively to form a winding.

20. A member suitable for the formation of an endless electrical winding comprising: a flexible, elongated insulating sheet having over substantially its entire surface a conductive coating comprising transverse conductors disposed along the length of said sheet on opposite sides thereof, the conductors at the ends of said sheet having complementary regions adapted to overlap upon closure of the ends of said sheet.

21. A member suitable for the formation of an endless electrical winding comprising: a flexible, elongated insulating sheet having over substantially its entire surface a conductive coating comprising transverse conductors disposed along the length of said sheet on opposite sides thereof, said conductors having central portions approximately normal to the longitudinal edges of said sheet and having edge portions angularly disposed with respect to said central portions, the conductors at the ends of said sheet forming complementary approximately triangular regions of single conductor thickness adapted to overlap upon closure of the ends of said sheet.

References Cited by the Examiner
UNITED STATES PATENTS

| | | | |
|---|---|---|---|
| 1,921,112 | 8/1933 | Apple | 310—265 |
| 2,020,058 | 11/1935 | Hendricks | 310—265 |
| 2,860,267 | 11/1958 | Hayes | 310—266 |
| 3,084,420 | 3/1960 | Burr et al. | 310—268 X |
| 3,109,113 | 10/1963 | Henry-Baudot | 310—13 |
| 3,144,574 | 8/1964 | Henry-Baudot | 310—268 |

MILTON O. HIRSHFIELD, *Primary Examiner.*

ORIS L. RADER, *Examiner.*

C. W. DAWSON, *Assistant Examiner.*